(12) United States Patent
Barron

(10) Patent No.: X8457
(45) Date of Patent: Oct. 20, 1834

(54) BLOCKS,TACKLE, & PULLEYS, OF METAL

(76) Inventor: James Barron

James Barron, of Philadelphia, Penn.
Letters Patent

The schedule referred to in these Letters Patent and making part of the same, containing a description in the words of the said James Barron, himself of his improvement in the manner of constructing tackle, blocks or pulleys of cast iron, or any other cast metal.

---

To all to whom these presents shall come: Be it known that I, James Barron of the City of Philadelphia, in the County of Philadelphia, and State of Pennsylvania, have invented a new and useful improvement in the manner of constructing tackle blocks or pulleys of cast iron or any other cast metal; and that the following is a full and exact description of the improvement made in the construction of the said machine as improved by me. What I claim as my invention is, the forming of the shell of this machine (commonly known by the appellation of a tackle block or pulley) of cast iron, or any other cast metal; by which means it can be made to answer all the purposes heretofore required of such machines, and although it may be much diminished in size in comparison with those now in use, yet it will contain a sufficiency of the metal to render it strong enough for all purposes for which such machines are required. What I particularly mean is, the construction of the shell of <u>all</u> blocks, for there are many, which are not denominated Tackle blocks.

Witnesses
Henry S. Coxe [?]
Henry M. Prevost

James Barron

[illegible]

[illegible]

[illegible]